Feb. 13, 1923.
F. R. DEURING.
SEMIAUTOMATIC LATHE.
FILED AUG. 2, 1922.
1,445,494.
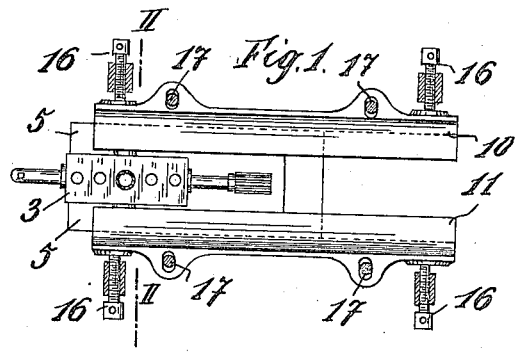
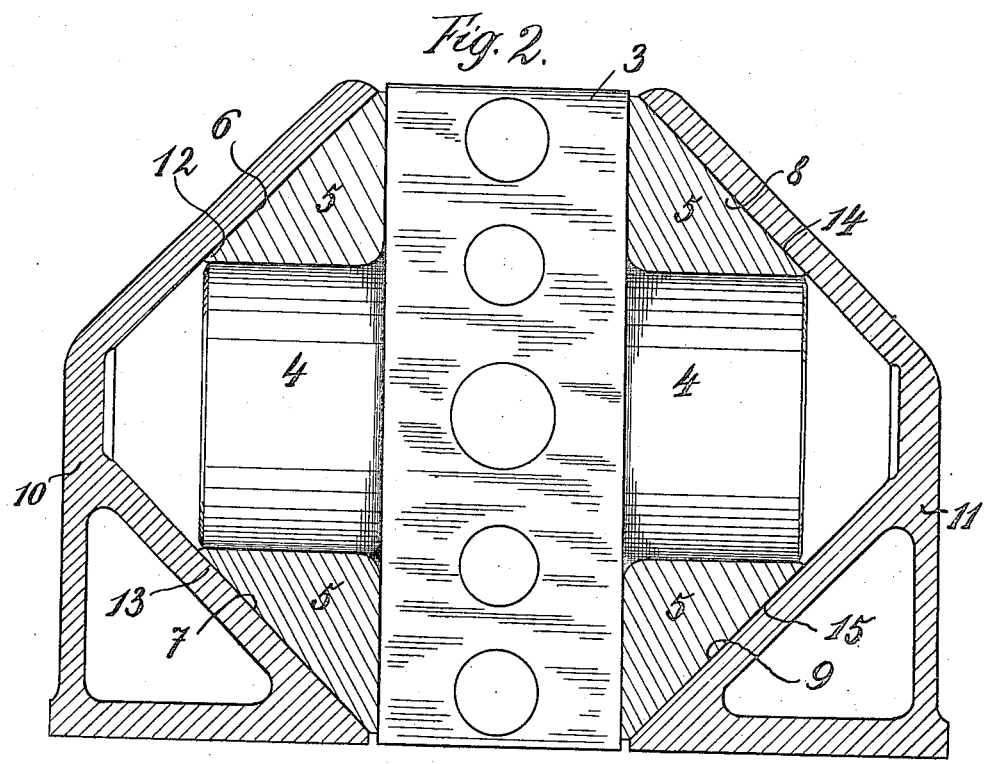
Inventor:
Fritz Richard Deuring
By Knight Bros.
atty Patented Feb. 13, 1923.

1,445,494

UNITED STATES PATENT OFFICE.

FRITZ RICHARD DEURING, OF MUNCHEN-GLADBACH, GERMANY.

SEMIAUTOMATIC LATHE.

Application filed August 2, 1922. Serial No. 579,253.

*To all whom it may concern:*

Be it known that I, FRITZ RICHARD DEURING, engineer, a subject of the German Republic, residing at Hohenzollernstrasse 134, Munchen-Gladbach, Germany, have invented certain new and useful Improvements in or Relating to Semiautomatic Lathes (for which I have filed an application in Germany June 25, 1919), of which the following is a specification.

It has long been a common practice, in connection with tool slides, turret slides and the like, where precision is required, to use prismatic slide rests, in which the wear is taken up automatically, so that accurate rectilinear guidance is maintained, whereas with square and dove-tail slide rests the wear results in looseness. The advantage referred to is, however dependent on the existence or exertion of pressure tending to force the sliding member against the rest or bed, as in a turning lathe, or in a heavy planing machine, where the weight of the work and the power exerted operate to that end. It has been proposed to adopt the prismatic formation in connection with semi-automatic and turret lathes, but this has heretofore not been successful, for the reason that the slide is not forced downwards, but lengthwise and laterally, so that prismatic guidance fails to achieve its purpose. In fact, in semi-automatic lathes, where the pressure due to tools operating over the work is solely in the upward and lateral directions, the prismatic guides have been found to be of distinct disadvantage owing to resulting wedge action. Moreover, the guides heretofore used have the defect that adjustment made to compensate for wear, results in lowering the slide and thus detracts from the accuracy of the work. If the worn surfaces require machining, insertions must be made in order to restore accurate centering.

The object of my invention is to remove these disadvantages.

To this end I make the bearing surfaces of the slide rest and the turret slide represent surfaces of a prism which is set upon one of its edges so as to be symmetrical in relation to a horizontal plane, and I make the cheeks of the slide rest horizontally adjustable in relation to each other, so that adjustment for taking up wear can be made without in any way shifting the axis of the turret in relation to the work. In the case of machines for special work, where there is abnormal pressure in one particular direction, tending to produce uneven wear, I may provide for this by suitably proportioning the area of the bearing surfaces, so that the depth to which they are worn remains uniform notwithstanding the unequal thrust.

A construction embodying the improved prismatic guide is shown in the annexed drawing, in which Fig. 1 is a plan view of the turret and slide rest, and Fig. 2 a section on the line II—II of Fig. 1 to a larger scale.

The turret 3 has two gudgeons 4 whereby it is mounted in the slide 5, whose surfaces 6, 7, 8 and 9 are portions of a regular four sided prism standing upon one of its edges, symmetrical to the horizontal. The slide is embraced by two cheeks 10, and 11, having corresponding bearing surfaces 12, 13, 14 and 15. These bearing surfaces may be proportioned in any desired relation to each other, according to the pressure to which they are subjected respectively. The cheeks 10 and 11 are horizontally adjustable by means of set screws 16, and are made fast by means of bolts 17.

Other suitable adjusting and fixing means may be used, and in other respects the details of construction may be varied without departing from the principle of the invention and the scope of the subjoined claim.

What I claim is:

In a semi-automatic turret lathe, the combination with a turret, and a slide carrying the turret, of a two-part prismatic guideway for said slide having bearing surfaces symmetrical with respect to the axis of the lathe in all directions, and means for horizontally adjusting said parts of the guideway perpendicularly to the said axis.

The foregoing specification signed at Cologne, Germany, this 18th day of July, 1922.

FRITZ RICHARD DEURING.

In presence of two witnesses:
 FLORIN RONYSN,
 FRITZ VOGEL.